No. 701,223. Patented May 27, 1902.
W. M. RICE.
MACHINE FOR REMOVING GARLIC FROM WHEAT.
(Application filed Oct. 7, 1901.)
(No Model.) 2 Sheets—Sheet 1.
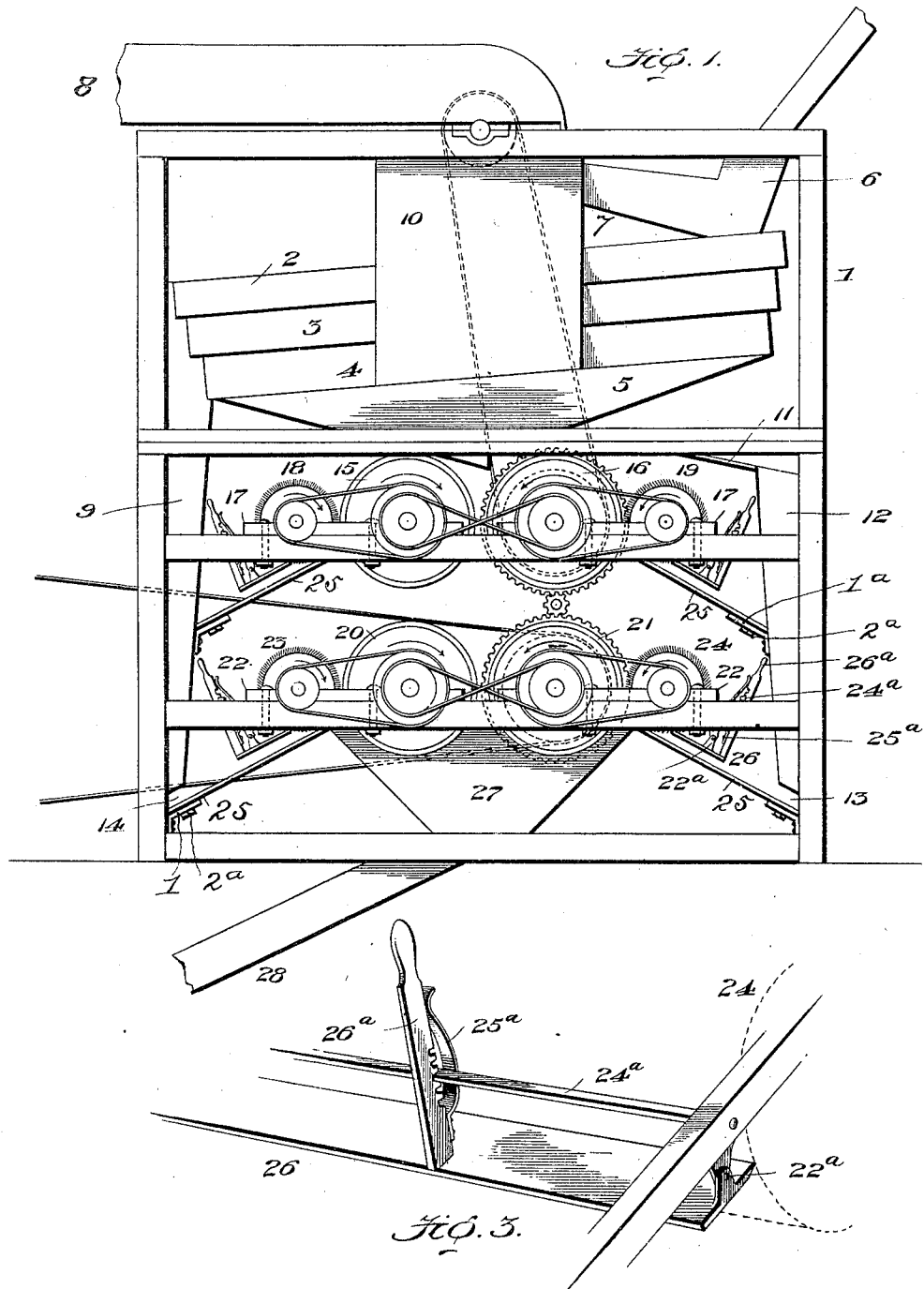

No. 701,223. Patented May 27, 1902.
W. M. RICE.
MACHINE FOR REMOVING GARLIC FROM WHEAT.
(Application filed Oct. 7, 1901.)
(No Model.) 2 Sheets—Sheet 2.
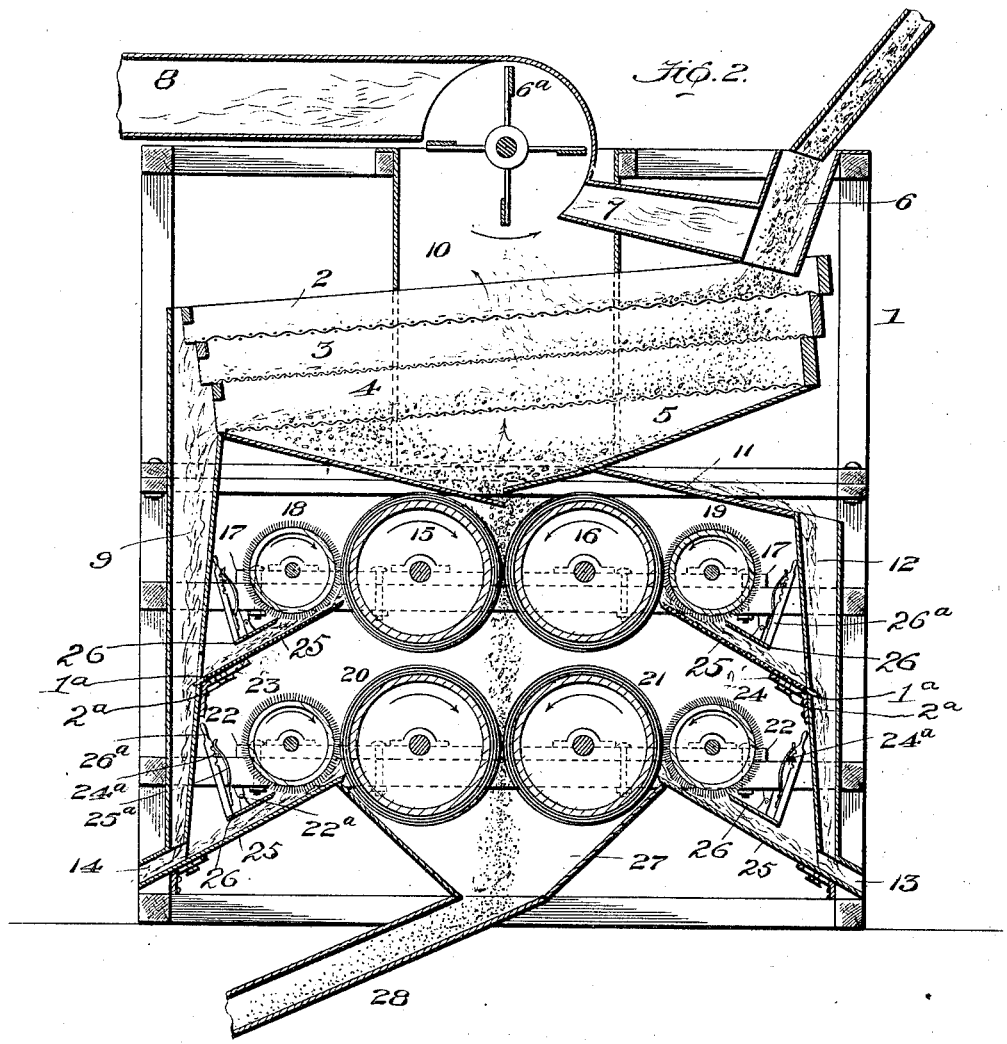

:::::::

UNITED STATES PATENT OFFICE.

WELBY M. RICE, OF MANASSAS, VIRGINIA, ASSIGNOR OF ONE-HALF TO IRVEN R. WOLVERTON, OF MANASSAS, VIRGINIA.

MACHINE FOR REMOVING GARLIC FROM WHEAT.

SPECIFICATION forming part of Letters Patent No. 701,223, dated May 27, 1902.

Application filed October 7, 1901. Serial No. 77,824. (No model.)

*To all whom it may concern:*

Be it known that I, WELBY M. RICE, a citizen of the United States, residing at Manassas, in the county of Prince William and State of Virginia, have invented certain new and useful Improvements in Machines for Removing Garlic from Wheat, of which the following is a specification.

This invention relates to grain cleaners or separators, and particularly to a machine for removing garlic from wheat.

The object of the invention is to provide a machine for separating all foreign matter from grain, particularly garlic from wheat, without crushing or injuring the wheat and leaving or depositing the wheat in a perfectly clean condition ready for flour-making.

A further object of the invention is to provide a machine for removing garlic from wheat during the passage of the wheat from the receiving-separator to the weighing-scales prior to its being converted into flour.

A still further object of the invention is to provide a series of cushion or elastic rollers between which the wheat falls from the receiving-separator and to which the garlic is made to adhere, while the wheat is permitted to pass therethrough, and a rotary brush operated on each of said rollers for removing the garlic from the rollers, said rollers and brushes being attachable under the receiving-separator and the discharge from one pair of brushes being upon one end of the machine, while the discharge of the other pair of brushes and the receiving-sieves being upon the opposite end of the machine, with the clean-wheat discharge from the central bottom of the machine.

It is well known that garlic is the most difficult of all foreign matter to remove from wheat. As far as known to me, while there are many separators for removing cockle these do not remove garlic, owing to the latter being of a different size and quality from cockle, and while there are also some machines purporting to remove garlic there is no machine prior to my invention that will separate garlic from wheat perfectly, leave the wheat uninjured, and thoroughly remove the garlic from the separating-rollers. It is therefore the purpose of my invention to overcome the various objections found in prior machines and to avoid the possibility of the least garlic going into the floor-rollers with the wheat.

In the accompanying drawings, forming a part of this application, Figure 1 is a side elevation showing driving mechanism for the rollers and brushes. Fig. 2 is a vertical longitudinal section of the machine. Fig. 3 is a detail perspective view of one of the brush-scrapers. Fig. 4 is a detail perspective view of one of the journal-bearing frames.

The same numeral references denote the same parts throughout the several views of the drawings.

Although my machine may be used separately, I prefer to attach it to the frame of and under a flour-mill receiving-separator, so that the wheat as it is stored or deposited in the mill through the receiving-separator will pass from the latter through my garlic remover or separator.

In the upper part of the frame 1 will be found the receiving-separator, which consists of a coarse sieve 2, fine sieve 3, and screening-sieve 4, having a hopper 5 depending therefrom. A grain-chute 6 carries the wheat onto the sieve 2, and a suction-fan $6^a$ draws the light foreign matter from the wheat through the channel 7 and from the hopper 5 and the sieves and discharges at 8 over the top of the frame 1. The sieves are set on an incline and overlap each other, so as to discharge into a chute 9. A casing 10 is secured central of the frame and under the fan and is open at the bottom, so as to form a central air-draft through the receiving-separator, and a screening-board 11 discharges into a chute 12. This chute discharges through an opening 13, and the chute 9 discharges through an opening 14, so that all matter not carried off by the fan is discharged through the said two openings.

The garlic-separator or the machine for removing the garlic from the wheat consists of an upper pair of rollers 15 and 16, having an outer covering of rubber or other similar material and journaled on the slotted journal-bearing plates 17, so as to revolve in such proximity to each other as to permit the wheat to pass between them and at the same time to arrest and crush the garlic, making it adhere to the roller-surface; rotary brushes 18 and 19, journaled on the frames 17 and revolving against the rollers to remove the garlic from the rollers; a pair of lower rollers 20 and 21, journaled on slotted plates 22 and in close proximity to the upper rollers, so as to receive the wheat and give it and any remaining garlic the same treatment as it received from the upper rollers; a pair of rotary brushes 23 and 24, journaled on the slotted plates 22 and working against the lower rollers to remove the garlic therefrom, and a garlic-board 25, inclined from each of said brushes. The upper boards discharge into the chutes 9 and 12, and the lower boards discharge through the openings 13 and 14. Each brush is provided with a scraper 26, hung from the beams 29 and 30 under a bar 24ª, secured at each end to said beams and pivoted at 22ª. Secured to each scraper is a toothed hand-lever 26ª, having a plate-spring 25ª, which keeps the teeth of the hand-lever engaged with the bar 24ª until the hand-lever is pulled, which will disengage the teeth from said bar and permit the scraper to be worked on the pivot 22ª by moving the hand-lever. This operation will give the scrapers more or less bearing on the brushes, as desired, and as soon as the hand-pressure of the lever is released the spring will hold it against movement by forcing the teeth in engagement with said bar. This adjustment of the scrapers is essential, first, because the brushes are adjustable, and, second, because it is often necessary to increase and diminish the bearing of the scrapers on the brushes to a very fine or small degree, owing to the character of the grain being treated. It will be seen that by moving the hand-lever one tooth or notch a very slight movement is imparted to the scraper. A hopper 27 receives the wheat from the lower rollers and discharges it through a spout 28 for weighing prior to being ground. The rollers and brushes, as well as the fan, are provided with suitable pulleys for driving them, and the rollers and brushes are made to be adjustable relative to each other by having the journal-slotted plates 17 and 22 slidably carried upon beams 29 and 30, so that one or both sets of rollers may be used, as desired. A roller and a brush being journaled on each slotted bearing-plate, which slot extends from one bearing to the other, the rollers and brushes of each plate are adjusted by simply loosening the bolts which pass through the slots of the said plates and the beams 29 and 30 and sliding the plates back and forth on said beams. The garlic-boards are slidably held under and in contact with the brushes by means of brackets 1ª, having a slot 2ᵇ and a set-bolt 2ª working through said slot to hold the boards in adjustable position relative to the brushes, so that the boards may be made to follow the adjustment of the brushes. This arrangement of the boards will admit of their ready removal for cleaning, inasmuch as they often become coated and gummed. Garlic being larger and softer than wheat, it is obvious that the rollers will catch the garlic, mash it, and carry it on the rubber surface of the rollers, whence it is removed by the rotary brushes onto the garlic-boards, and by the time the wheat has passed through both sets of these rollers there is no garlic remaining in the wheat, for whatever garlic escapes with the wheat from the upper rollers will be removed by the lower rollers. It will be seen that the chutes 9 and 12 receive from the sieves and from the garlic-boards without having a separate chute-discharge for each of them.

Having thus described my invention, what I claim as new, and desire to secure by Letters Patent, is—

1. The combination, with the rollers, the rotary brushes working against the rollers, and the scraper-bars, of the scrapers pivotally hung adjacent to the brushes, and the spring-controlled tooth-levers secured to the scrapers and engaging said bars for operating the scrapers to vary their bearing on the brushes.

2. The combination with the rollers, and the rotary brushes, of the bearing-plates upon each of which a roller and a brush are journaled and having a slot extending from one bearing to the other of said plates to permit the adjustment of the plates so that the latter will carry with them without removal therefrom the rollers and brushes.

3. In a grain-separator, the combination, with the rollers, the rotary brushes, and the chutes, of the detachable boards reaching from the brushes into the chutes, and means for adjusting the boards relative to the brushes.

4. In a machine for separating garlic from wheat, the combination of the rollers and brushes, the plates each forming a bearing for a roller and a brush and having a slot extending from one bearing to the other for adjustment, the scraper-bars, the pivoted brush-scrapers, having a toothed hand-lever for operating them, a plate-spring on the levers to keep the teeth in engagement with the said bar, the chutes, the removable garlic-boards reaching from the brushes to the chutes, and the slotted brackets upon which the boards are adjusted, substantially as and for the purpose set forth.

In witness whereof I hereunto set my hand in the presence of two witnesses.

WELBY M. RICE.

Witnesses:
W. P. LASKIN,
F. C. RORABAUGH.